(12) United States Patent
Schmidt et al.

(10) Patent No.: US 6,789,813 B2
(45) Date of Patent: Sep. 14, 2004

(54) TORSION BAR SPRING ARRANGEMENT, PARTICULARLY A STABILIZER ARRANGEMENT, AND A METHOD OF MAKING SAME

(75) Inventors: Roland Schmidt, Stockdorf (DE); Thomas Kautz, Kammerberg (DE); Torsten Wey, Duisburg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 28 days.

(21) Appl. No.: 10/175,904

(22) Filed: Jun. 21, 2002

(65) Prior Publication Data

US 2002/0195791 A1 Dec. 26, 2002

(30) Foreign Application Priority Data

Jun. 23, 2001 (DE) .......................................... 101 30 401

(51) Int. Cl.$^7$ ............................................ B60G 21/055
(52) U.S. Cl. ............................ 280/124.166; 280/124.165
(58) Field of Search .................... 280/124.166, 124.165

(56) References Cited

U.S. PATENT DOCUMENTS

| | | | | | |
|---|---|---|---|---|---|
| 1,209,746 | A | * | 12/1916 | Morse ................. | 280/124.165 |
| 2,085,006 | A | * | 6/1937 | Coleman ............. | 280/124.165 |
| 2,730,375 | A | * | 1/1956 | Reimspiess et al. .. | 280/127.166 |
| 2,733,934 | A | * | 2/1956 | Muller ................ | 280/124.166 |
| 2,840,390 | A | * | 6/1958 | Walker ................ | 280/124.165 |
| 2,988,379 | A | * | 6/1961 | Walker ................ | 280/124.165 |
| 4,884,790 | A | * | 12/1989 | Castrilli .............. | 280/124.166 |
| 5,163,701 | A | * | 11/1992 | Cromley, Jr. ........ | 280/124.166 |
| 5,390,949 | A | * | 2/1995 | Naganathan et al. .. | 280/124.165 |
| 5,575,502 | A | * | 11/1996 | Oppitz et al. ........ | 280/124.166 |

FOREIGN PATENT DOCUMENTS

| | | | |
|---|---|---|---|
| DE | 3705520 | B1 * | 9/1988 |
| DE | 43 35 528 | | 4/1995 |
| DE | 44 43 809 | | 4/1996 |
| DE | 19508611 | B1 * | 9/1996 |
| DE | 19744732 | B1 * | 4/1999 |
| DE | 19744733 | B1 * | 4/1999 |
| DE | 19754539 | B1 * | 6/1999 |
| DE | 19903435 | B1 * | 8/2000 |
| DE | 10134715 | B1 * | 2/2003 |
| DE | 10148095 | B1 * | 4/2003 |
| EP | 0 648 625 | | 4/1995 |
| FR | 2803001 | B1 * | 6/2001 |
| GB | 2377415 | B1 * | 1/2003 |
| JP | 4-113913 | B1 * | 4/1992 |
| JP | 4-169320 | B1 * | 6/1992 |
| JP | 2000-177354 | B1 * | 6/2000 |
| WO | WO-03/008214 | A1 * | 1/2003 |
| WO | WO-03/008215 | A1 * | 1/2003 |

* cited by examiner

Primary Examiner—Darren W. Ark
(74) Attorney, Agent, or Firm—Crowell & Moring LLP

(57) ABSTRACT

A torsion bar spring arrangement, particularly a stabilizer arrangement, for a double-track vehicle, has at least one prestressed spring element which limits the introduction of force into the torsion bar spring or the stabilizer to a value defined by the prestressing force of the spring element, in which case the spring element acts as an overload protection such that, when a force is introduced which significantly exceeds the prestressing force, the torsion bar spring arrangement would be damaged without this spring element. The torsion bar spring can have a divided construction and the spring element can be clamped in between the two parts of the torsion bar spring, in which case these two parts of the torsion bar spring can be mutually rotatable by way of an actuator. Preferably, the torsion bar spring parts each have a driving device which is clamped by way of the spring element between two stops which, for the first torsion bar spring part, are fixedly connected with the housing of the actuator ad, for the second torsion bar spring part, are connected with its control element.

4 Claims, 2 Drawing Sheets

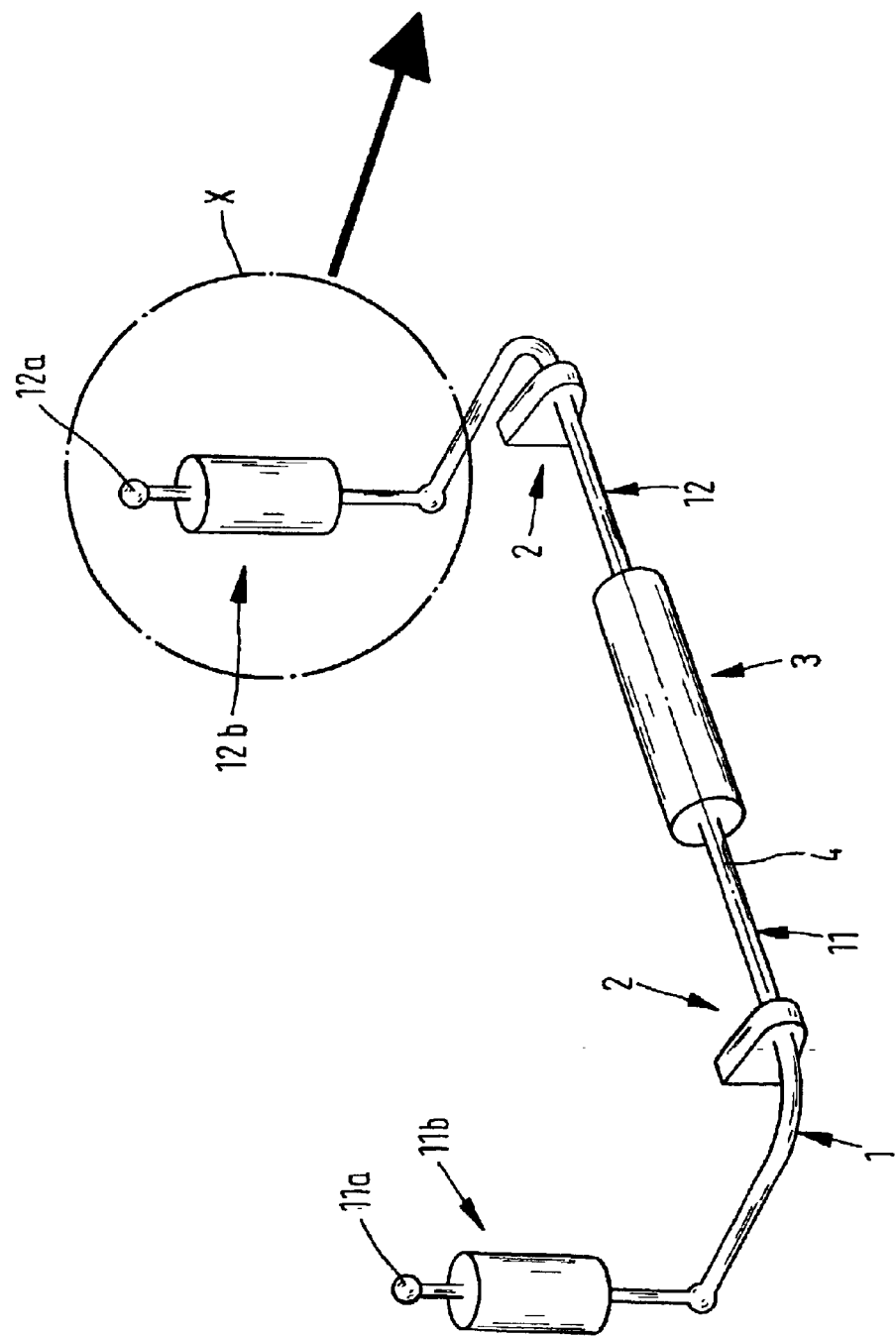

TORSION BAR SPRING ARRANGEMENT, PARTICULARLY A STABILIZER ARRANGEMENT, AND A METHOD OF MAKING SAME

BACKGROUND AND SUMMARY OF THE INVENTION

This application claims the priority of German Patent Document DE 101 30 401.3, filed on, Jun. 23, 2001, the disclosure of which is expressly incorporated by reference herein.

This invention relates to a torsion bar spring arrangement, particularly to a stabilizer arrangement, for a double-track vehicle, having at least one prestressed spring element which limits the introduction of force into the torsion bar spring or the stabilizer to a value defined by the prestressing force of the spring element. With respect to the technical environment, reference is made, for example, to European Patent Document EP 0 648 625 A1.

Stabilizer arrangements or generally torsion bar spring arrangements are generally customary in the case of double-track vehicles. For example, in order to limit the effect of the stabilizer to the necessary rolling forces, it has been suggested to arrange prestressed spring elements with or without damping as tension or pressure rods between the stabilizer ends and the wheel axles of the vehicle.

An aspect of certain preferred embodiments of the invention relates to how damage can be avoided on a torsion bar or stabilizer arrangement which are caused by an introduction of force into the torsion bar or stabilizer arrangement which significantly exceeds the normal value occurring in the driving operation. This is particularly important when at least two parts of the torsion bar spring can be rotated with respect to one another by way of an actuator because this actuator must then be protected from an overload—caused by an unusually high introduction of external force into the torsion bar spring arrangement.

This aspect may be achieved in that the spring element acts as an overload protection such that, when a force is introduced which significantly exceeds the prestressing force, the torsion bar spring arrangement would be damaged without this spring element. Advantageous developments and further developments are in preferred embodiments.

According to certain preferred embodiments of the invention, an arrangement is suggested which, in the event of the occurrence of a brief excessively high loading of the torsion bar spring arrangement, protects the latter in that the introduction of force is reduced to the maximal value of the normal load. This arrangement comprises at least one prestressed spring element. This prestressing is selected such that, in the case of the maximally occurring normal loading of the torsion bar or stabilizer arrangement, the spring element transmits the affecting force unchanged whereas, in the case of a so-called overload, which occurs only briefly in the form of a momentum or the like, the spring element will deform, whereby the torsion bar spring arrangement or the torsion bar or stabilizer are not acted upon by this overload momentum. The loading of the torsion bar spring arrangement is therefore reduced to the normal amount defined by the prestressing force of the spring element.

As mentioned above, this suggested measure is particularly helpful for a so-called active chassis of a motor vehicle, in which case a stabilizer (or generally a torsion bar spring) has a divided construction and the (two) parts of the stabilizer (or of the torsion bar spring) can be rotated with respect to one another by way of an actuator or servo motor, as illustrated, for example, in German Patent Document DE 44 43 809 A1. In this case, not only such an actuator but the entire stabilizer arrangement can be designed or dimensioned on the basis of arbitrary marginal conditions such that the limit of the mechanical loading (for example, also with respect to the strength of the material of the stabilizer itself, but particularly with respect to the torque load of the actuator or servo motor) is reached specifically in an extreme driving operation. So far, it had been necessary in this case to design the stabilizer or torsion bar spring arrangement not only for the highest possible load with respect to driving dynamics but even for taking into account an additional load (in the following, called "overload") which occurs, for example, as a result of the exceeding of a threshold or the like. So far, such events had to be taken into account when designing the system with respect to the forces, although cases in which such an extreme loading occurs with a simultaneous overload, that is, such a high introduction of force, are extremely rare.

In contrast, by way of certain preferred embodiments of the present invention, the system or the stabilizer or torsion bar spring arrangement has to be designed only for the normal maximal load. If a still higher momentum-type, that is, brief introduction of force, takes place, this additional force exceeding the prestressing force of the spring element, the spring element will be compressed so that this overload occurring only briefly in the form of a momentum will be kept away from the stabilizer or from an actuator or servo motor provided in the system or in the arrangement.

It is pointed out that a spring element operating as an overload protection and therefore also called an overload spring can basically be inserted in an appropriately divided stabilizer while the latter is not provided with an actuator because a single prestressed spring element according to certain preferred embodiments of the invention is sufficient. In contrast, in the case of an arrangement according to the above-mentioned European Patent Document EP 0 648 625 A1, two overload spring elements of this type are required.

Other objects, advantages and novel features of the present invention will become apparent from the following detailed description of the invention when considered in conjunction with the accompanying drawings.

BRIEF DESCRIPTION OF THE DRAWINGS

FIG. 1 shows a stabilizer arrangement according to one embodiment of the invention which has a divided stabilizer (or a divided torsion bar spring) with an actuator as well as two spring elements operating as an overload protection;

FIG. 2 shows the detail X from FIG. 1 in a cut-open representation; and

DETAILED DESCRIPTION OF THE DRAWINGS

Figure 3:
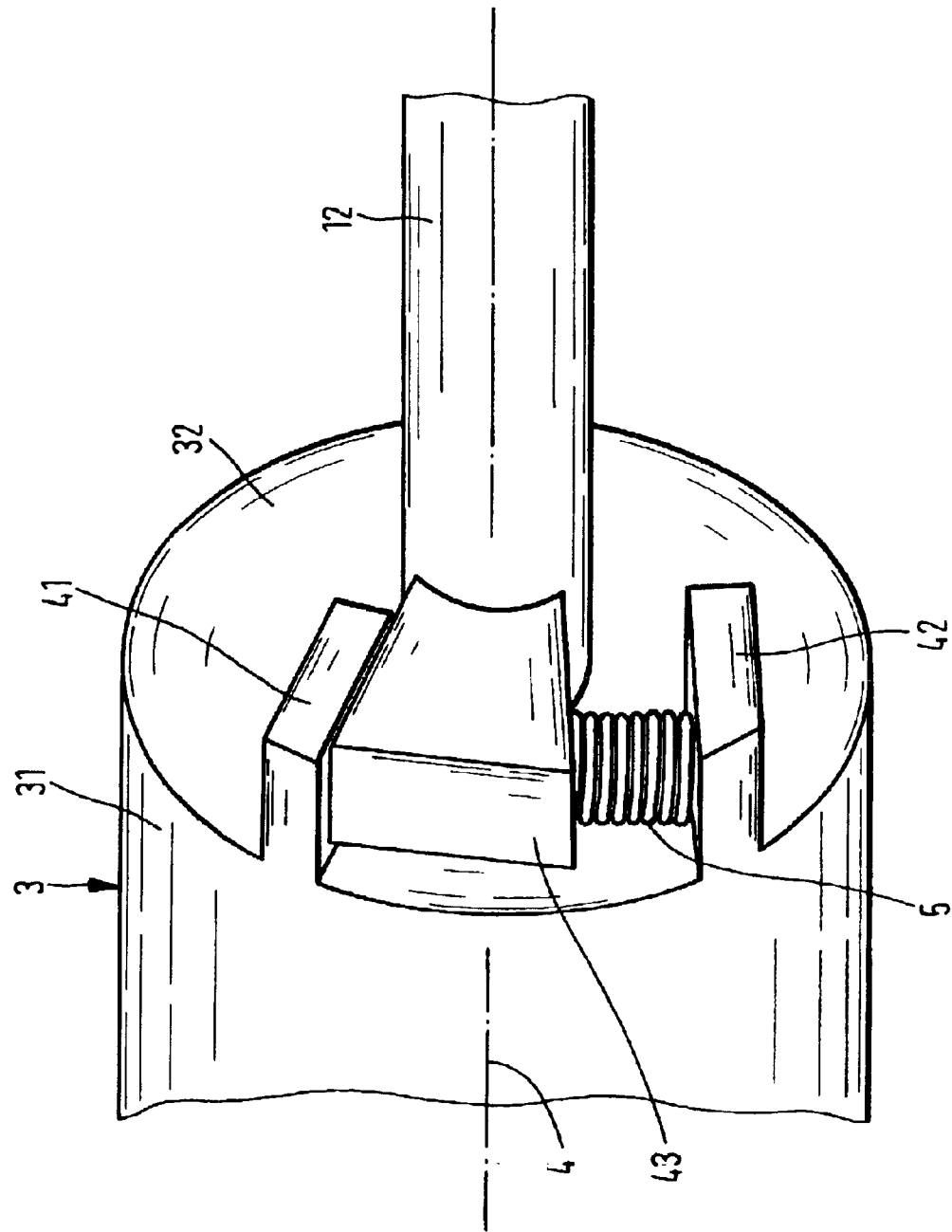
FIG. 3 shows a detailed view of another embodiment, the spring elements being arranged on the lateral surfaces of the actuator or servo motor, by way of which the two stabilizer halves can be rotated with respect to one another.

In FIG. 1, reference number 1 indicates a divided stabilizer of a motor vehicle, particularly of a passenger car, which is supported in the conventional manner in two bearings 2 and is connected or linked by way of its two free ends 11a, 12a in each case on a left and right suspension link respectively, which is not shown, of the double track vehicle. The stabilizer 1 comprises two stabilizer parts 11, 12 which can be (slightly) rotated with respect to one another by way of a so-called actuator 3 (also called servo motor 3) about an axis 4 which is defined by the sections of the stabilizer parts 11, 12 arranged side by side virtually in series with the insertion of the actuator 3.

Each stabilizer part 11, 12 is supported by way of a so-called pendulum support 11b and 12b, respectively, on the above-mentioned, not shown left or right suspension link, that is, between the actual torsion bar spring element of the stabilizer part 11 and 12, respectively, and its linking point ends 11a and 12a, respectively, on the respective suspension link A so-called pendulum support 11b and 12b is inserted, the pendulum support 12b (here, right) being enlarged and partially broken open in FIG. 2.

In this embodiment according to FIGS. 1 and 2, each pendulum support 12b and 11b, respectively, has a divided construction and comprises an upper bar-shaped section 6 and a lower bar-shaped section 7 which support one another only by way of a prestressed spring element 5. The spring element 5, which is preferably constructed as a coil pressure spring, is guided in a cylinder 8 which is preferably rigidly connected with one of sections 6 or 7. The spring element 5 is now prestressed such, that is, clamped in with such a prestressing force between the two mutually displaceable sections 6 and 7 of the pendulum support 12b and 11b, respectively, that normal forces introduced from the suspension link into the stabilizer 1, are transmitted in an unfalsified manner, i.e. that in the process, the spring element 5 is not deformed (for example, compressed). However, in the event of an overload, that is, when the force introduced from the suspension link into the stabilizer 1 exceeds the value of the prestressing force of the spring element 5, the spring element 5 is first deformed, and the stabilizer 1 or the illustrated stabilizer arrangement and, therefore particularly, also the actuator 3 are protected for the duration of this overload momentum and are protected from this introduction of force which is significantly above the normal load.

Another embodiment of the present invention is illustrated in FIG. 3 as a cutout. It is a perspective lateral view of the actuator 3 by way of which the two stabilizer parts 11, 12 can be mutually rotated about the axis 4. For this purpose, the stabilizer part 12 illustrated here can be rotated by way of a control element 32 provided in the housing 31 of the actuator 3 about the longitudinal axis 4 of this stabilizer part 12 with respect to the housing 31 of the actuator 3. As illustrated, the stabilizer part 12 is in this case supported by way of a spring element 5, according to the invention, on the control element 32, which will be explained in detail in the following. However, it should first be mentioned that, on the opposite face of the actuator 3, which is not visible in FIG. 3, the other stabilizer part 11 in that case is connected with the housing 31 of the actuator 3 by way of a comparable insertion of such an overload spring element 5.

With reference to the face of the actuator 3 visible in FIG. 3, two stops 41, 49 are shown which, mutually spaced by an angle sector; are mounted on the control member 32. The stabilizer part 12 itself is provided with a driving device 43 which projects between the two stops 41, 42. In a concrete manner, the driving device 43 rests with its first side against the first stop 41, or is pressed by way of the overload spring element 5, which is clamped in between the second side of the driving device 43 and the second stop 42, with its first side against the first stop 41. In this case, the spring element 5 is prestressed to such an extent that, at normal forces introduced into the stabilizer part 12, or at normal adjusting forces transmitted from the control element 32 to the-stabilizer part 12, the condition illustrated in FIG. 3 is maintained; that is, the driving device 43 will then always rest against the stop 41. If, in contrast, the assigned suspension link or the linking point 12a of the stabilizer part 12 not visible here is acted upon by overload, that is, by a force which significantly exceeds the prestressing force of the spring element 5, the spring element 5 constructed as a coil pressure spring is compressed, so that the overload component exceeding the prestressing force is kept away from the actuator as desired. This overload component is then obviously not transmitted to the actuator control element 32 and is therefore not introduced into the actuator 3. This actuator 3 therefore does not have to be designed for such extreme loads.

The arrangement on the opposite face is comparable to the actuator face visible in FIG. 3, with the exception that there the stops 41 and 42 are provided on the housing of the actuator 3 (instead of on its control element 32). In this case, it should also be pointed out that naturally a large number of detail, particularly of the constructive type, may be designed to deviate from the illustrated embodiment without leaving the content of the envisioned embodiments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A torsion bar spring arrangement for a vehicle, comprising at least one prestressed spring element which limits an introduction of force into a torsion bar spring or a stabilizer to a value defined by a prestressing force of the spring element, wherein the spring element acts as an overload protection such that, when a force is introduced which significantly exceeds the prestressing force, the torsion bar spring arrangement would be damaged without the spring element, wherein at least two parts of the torsion bar spring can be rotated with respect to one another by way of an actuator, and wherein the torsion bar spring parts each have a driving device which is clamped by way of the spring element between two stops which, for a first of the torsion bar spring parts, are fixedly connected with a housing of the actuator and, for a second of the torsion bar spring parts, are connected with a control element of the actuator.

2. A torsion bar spring arrangement for a vehicle, comprising at least one prestressed spring element which limits an introduction of force into a torsion bar spring or a stabilizer to a value defined by a prestressing force of the spring element, wherein the spring element acts as an overload protection such that, when a force is introduced which significantly exceeds the prestressing force, the torsion bar spring arrangement would be damaged without the spring element, wherein the torsion bar spring has a divided construction, and the spring element is clamped in between two parts of the torsion bar spring, wherein at least two parts of the torsion bar spring can be rotated with respect to one another by way of an actuator, and wherein the torsion bar spring parts each have a driving device which is clamped by way of the spring element between two stops which, for a first of the torsion bar spring parts, are fixedly connected with a housing of the actuator and, for a second of the torsion bar spring parts, are connected with a control element of the actuator.

3. A torsion bar suspension assembly for a vehicle, comprising:

a torsion bar spring, and at least one spring element which is prestressed to limit an introduction of force to the torsion bar spring so that the spring element acts as an overload protection to protect the torsion bar suspension assembly from damage in case of a force which exceeds a maximally occurring normal loading of the torsion bar spring, wherein at least two parts of the torsion bar spring can be rotated with respect to one another by way of an actuator, and wherein the torsion bar spring parts each have a driving device which is clamped by way of the spring element between two stops which, for a first of the torsion bar spring parts, are fixedly connected with a housing of the actuator and, for a second of the torsion bar spring parts, are connected with a control element of the actuator.

4. A method of making a torsion bar spring arrangement for a vehicle, comprising:

providing a torsion bar spring or stabilizer, operatively connecting at least one spring element to limit an introduction of force into the torsion bar spring or stabilizer to a value defined by a prestressing force of the spring element, and prestressing the spring element so that the prestressed spring element acts as an overload protection such that when a force is operatively introduced which substantially exceeds the prestressing force, the torsion bar spring arrangement would be damaged without the prestressed spring element, wherein at least two parts of the torsion bar spring can be rotated with respect to one another by way of an actuator, and wherein the torsion bar spring parts each have a driving device which is clamped by way of the spring element between two stops which, for a first of the torsion bar spring parts, are fixedly connected with a housing of the actuator and, for a second of the torsion bar spring parts, are connected with a control element of the actuator.

* * * * *